(12) United States Patent
Frey

(10) Patent No.: US 8,752,136 B2
(45) Date of Patent: Jun. 10, 2014

(54) ACCESS MANAGEMENT METHOD

(75) Inventor: Vincent Frey, Cesson-Sevingne (FR)

(73) Assignee: Orange, Paris (FR)

( * ) Notice: Subject to any disclaimer, the term of this patent is extended or adjusted under 35 U.S.C. 154(b) by 174 days.

(21) Appl. No.: 12/663,071

(22) PCT Filed: Jun. 23, 2008

(86) PCT No.: PCT/FR2008/051124
§ 371 (c)(1),
(2), (4) Date: Jan. 15, 2010

(87) PCT Pub. No.: WO2009/007578
PCT Pub. Date: Jan. 15, 2009

(65) Prior Publication Data
US 2010/0180320 A1   Jul. 15, 2010

(30) Foreign Application Priority Data
Jun. 27, 2007  (FR) ...................... 07 56083

(51) Int. Cl.
*G06F 7/04*       (2006.01)
*H04L 29/06*      (2006.01)
*G06F 21/30*      (2013.01)
*G06F 21/31*      (2013.01)
*G06F 21/62*      (2013.01)

(52) U.S. Cl.
CPC ............ *H04L 63/083* (2013.01); *H04L 63/104* (2013.01); *G06F 21/30* (2013.01); *G06F 21/31* (2013.01); *G06F 21/62* (2013.01)
USPC ............................................................ 726/4

(58) Field of Classification Search
CPC ..... H04L 63/083; H04L 63/104; G06F 21/30; G06F 21/31; G06F 21/62
USPC .............................. 726/2–4, 6, 17, 21, 27, 28
See application file for complete search history.

(56) References Cited

U.S. PATENT DOCUMENTS

| 6,178,508 | B1  |   | 1/2001  | Kaufman |   |
|-----------|-----|---|---------|---------|---|
| 6,775,668 | B1  | * | 8/2004  | Goel .................................... | 1/1 |
| 6,959,394 | B1  | * | 10/2005 | Brickell et al. .................... | 726/5 |
| 2008/0086767 | A1 | * | 4/2008 | Kulkarni et al. .................. | 726/9 |

* cited by examiner

*Primary Examiner* — Peter Shaw
(74) *Attorney, Agent, or Firm* — Drinker Biddle & Reath LLP

(57) ABSTRACT

The invention relates to a data transmission system that includes the step of a first user or at least one second user accessing a resource. The novel feature of the invention is the fact that access to said resource is inhibited as long as said first and second users have not requested access thereto.

10 Claims, 1 Drawing Sheet

ACCESS MANAGEMENT METHOD

CROSS-REFERENCE TO RELATED APPLICATIONS

This application is the U.S. national phase of the International Patent Application No. PCT/FR2008/051124 filed Jun. 23, 2008, which claims the benefit of French Application No. 07 56083 filed Jun. 27, 2007, the entire content of which is incorporated herein by reference.

FIELD OF THE INVENTION

The invention relates to a data transmission method including a step of access to a resource by a first user or at least one second user.

BACKGROUND OF THE INVENTION

In the context of this document, the term "user" can refer to a physical person, an organization, a department, a resource, or a process, for example. In the current state of the art, all requests for access to a resource relate to only one user. Prior art methods cannot be used when it has been decided that a first user can access a resource if and only if at least one second user has previously requested access to the same resource as the first user. One example of this would be consultation of a will by all the beneficiaries via the Internet. A beneficiary can find out the content of the will only once all the beneficiaries have requested access to it. Another example would be access to a telephone bridge by a plurality of users of the telephone bridge if (and only if) all users are ready, i.e. have already been connected to the bridge. The fact that prior art methods cannot be used in the situations described above constitutes a drawback of the current state of the art.

SUMMARY OF THE INVENTION

The present invention aims to alleviate this drawback by proposing to link access to a resource to a condition.

The method of the invention is characterized in that said access to said resource is inhibited as long as said first user and said second user have not requested to access it.

In a variant, the method is characterized in that it further includes:
- a first authentication step of authentication of said first user by a management system;
- a first request step of said first user requesting access to said resource;
- at least one second authentication step of authentication of said second user by said management system;
- at least one second request step of said second user requesting access to said resource; and
- a step of waiting until said first access request step and at least said second access request step have been executed.

The method of the invention has the advantage of allowing access to a resource only if a first user and at least one second user request to access it.

A variant of the method is characterized in that it further includes, after said first access request step, a step of reporting completion of said first access request step to said at least one second user.

In this way, the second user is informed that the first user has already requested access and can therefore act accordingly.

A variant of the method is characterized in that it further includes:

- a step after said authentication steps of said users giving special information specific to said users; and
- a step of determination of a code as a function of the special information, said access step being executed only if said code corresponds to a reference specific to said resource.

This has the advantage of enhancing security because of the use of specific and in principle secret information.

A variant of the method is characterized in that it further includes a step of distributing said special information specific to said users beforehand.

A variant of the method is characterized in that said special information is chosen by a resource manager.

This enables central management of the special information and its confidentiality.

A variant of the method is characterized in that said special information is chosen by said users.

This has the advantage that a user can choose special information that they can easily remember.

A variant of the method is characterized in that the step of determining said code includes changing a variable as a function of said special information.

The invention also relates to a management system including:
- means for authenticating a first user;
- means for receiving from said first user a request to access a resource;
- means for authenticating at least one second user;
- means for receiving from said second user a request to access said resource;

said system (G2) being characterized in that it further includes:
- means for waiting until the first access request and at least the second access request have been received; and
- means for authorizing access by at least one of said first and second users to said resource.

The invention also provides a computer program including program code instructions for executing at least one of the steps of the method described above when said program is executed on a computer.

The invention further provides a computer program product comprising program code means stored on a computer-readable medium for executing at least one of the steps of a method as described above when said program is executed on a computer.

The invention also provides a data medium containing a program as described above.

BRIEF DESCRIPTION OF THE DRAWINGS

The invention is made clear by the following description, which is given by way of non-limiting example and with reference to the appended drawings, in which.

DETAILED DESCRIPTION

In the context of this document, the terms "authenticate" and "authentication" are used in a broad sense and cover authentication comprising only one step and authentication comprising more than one step.

An example of authentication comprising only one step is entry by a user into a management system of a code known only to them, for example a PIN (personal identification number). The management system can authenticate the user on the basis of this code.

An example of authentication comprising more than one step is authentication divided into two steps: an identification step and an authentication step as such. During the identification step, the management system prompts a user to enter a login, for example. During the authentication step, the management system prompts the user to enter a password corresponding to the login.

Figure 1:
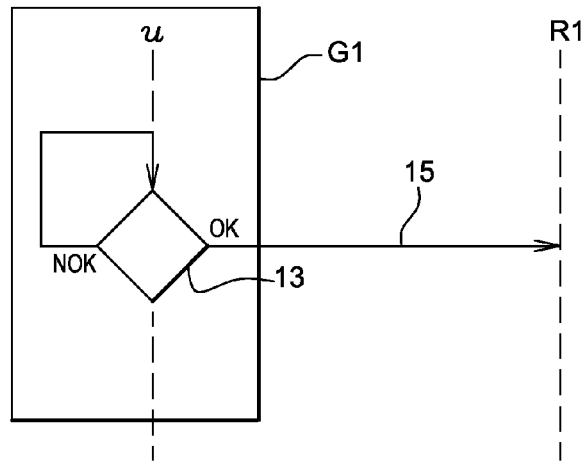
FIG. 1 is a flowchart of the steps of a prior art method of accessing a resource.

In the situation described with reference to FIG. 1 it is assumed that a user U has been approved to access a resource R1 during a previous approval step. This information (i.e. this approval) is stored in a management system G1 in non-volatile memory, for example in a database. Thus the management system G1 recognizes that the user U has the right to access the resource R1.

During a step 13 the management system G1 waits for entry of a specific code known only to the user U in order for the management system G1 to authenticate them, in the broad sense of the term. During a step 13, the user enters their code, for example a PIN known only to them. The system G1 authenticates the user U on the basis of this code.

If the user U is not authenticated by the system G1, the process stops at the step 13. In contrast, if the user U is authenticated by the system G1, the process continues to an access request step 15.

During the step 15, the user U requests access to the resource R1. Because the user U has already been approved to access the resource R1, the management system G1 (or the resource R1 itself at the request of the management system G1) authorizes access to the resource R1 and the user U can consequently access the resource R1. In contrast, if the user U has not already been approved to access the resource R1, and therefore has no right to access that resource R1, the user U is authenticated but is not authorized to access the resource R1. However, in the above method, whether the user U does or does not have access to the resource R1 is independent of the actions of any other user.

Figure 2:
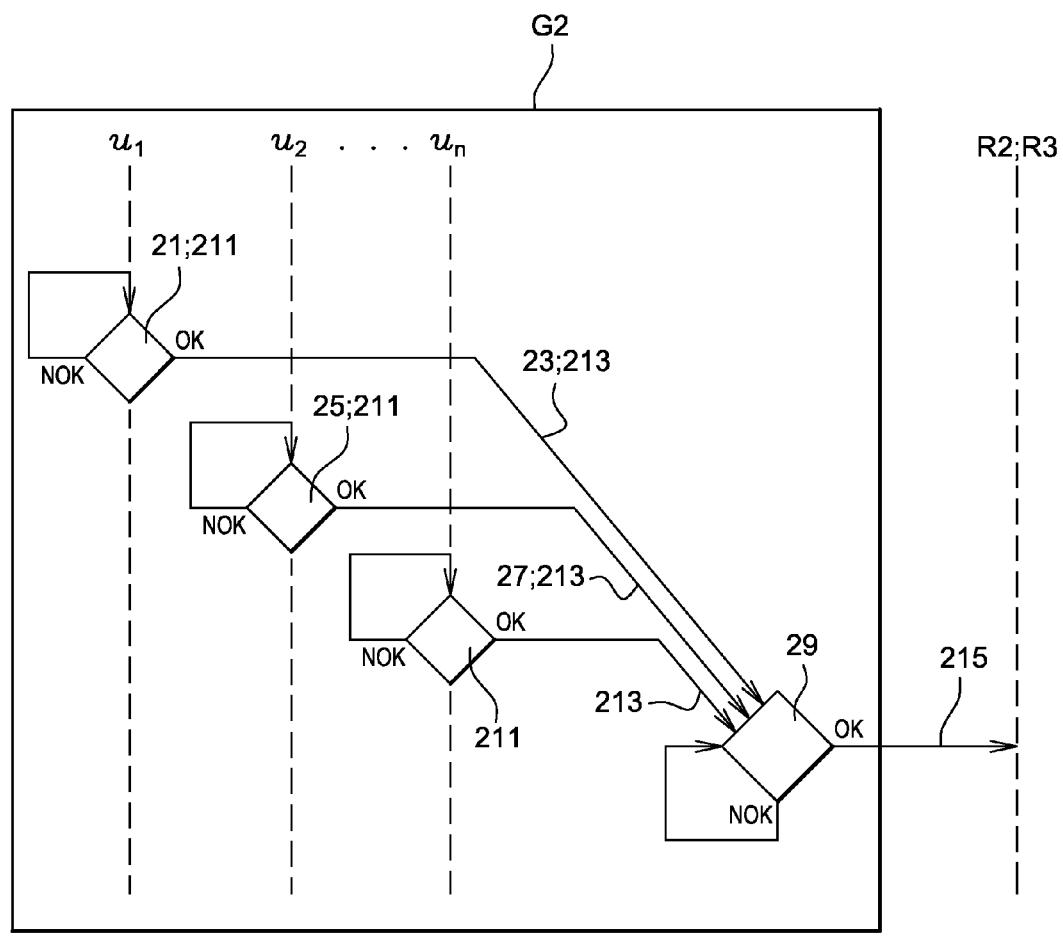
FIG. 2 is a flowchart of the steps of a method of the invention for accessing a resource.

The method of the invention is explained below. It is illustrated by the FIG. 2 diagram. It is assumed that a first user U1 and at least one second user U2 have been approved beforehand to access a resource R2. Information concerning this approval is stored in a management system G2 in a non-volatile memory M1, for example in a database. Thus the identity management system G2 recognizes that the users U1 and U2 have the right to access the resource R2. The users U1 and U2 therefore belong to a previously-created group of users who have the a priori right to access the resource R2. Using this method, the user U1 is authenticated during a step 21 and requests access to the resource R2 during a step 23. During a waiting step 29, the management system G2 verifies whether both users U1 and U2 have requested access to the resource R2 and therefore, in the present example, whether the other user, i.e. the second user U2, has also requested access to the resource R2. This verification checks the presence of a record of an access request by the user U2 in another memory M2 of the system G2, for example. If this is not so (i.e. if no such record is present), the management system G2 does not authorize the user U1 to access the resource R2 and the user U1 therefore cannot access the resource R2. The access request by the user U1 is nevertheless stored, for example in the same memory M2 of the system G2. The second user U2 is authenticated in turn during a step 25 and requests access to the resource R2 during a step 27. The management system then verifies during a step 29 whether both users U1 and U2 have requested access to the resource R2, i.e. in the present example it checks for the presence in the memory M2 of the record of the request made by the other user (i.e. the first user U1). The result of the verification during the step 29 is then positive and during an access step 215 the management system G2 authorizes both users U1 and U2 to access the resource R2.

With N users U1, U2, . . . , Un, the management system G2 recognizes beforehand that the users U1, U2, . . . , Un have the right to access a resource R3. The users U1, U2, . . . , Un thus belong to a previously-created group of users who have the a priori right to access the resource R3. The users U1, . . . Un are authenticated individually by the management system G2 during an authentication step 211. During a step 213 each of them individually requests access to the resource. The management system verifies during a subsequent verification step 215 whether all the users U1, . . . , Un have requested access to the resource R3. As soon as the result of the verification step 29 is positive, the users U1, . . . , Un can access the resource R3. This step verifies the presence in a memory M3 of records of access requests from (n−1) users, for example. The users U1, . . . , Un must execute the steps 211 and 213 described above, synchronously or asynchronously, in any order and without it being necessary for the users to be physically located in the same place.

In one implementation, the user U1 is authenticated by the management system G2, and when the user U1 requests access to the resource R3 the management system G2 indicates to the user U1 that it is waiting for the other users U2, . . . , Un also to request access to the resource R3. At this time, the other users U2, . . . , Un are alerted by the management system G2. Once they have been authenticated in turn and have requested access to the resource, the management system authorizes the user U1 to access the resource R3. In parallel with this, the management system G2 authorizes the other users U2, . . . , Un to access the resource R3.

In another implementation, after a given user has requested access to the resource R3, the management system G2 prompts them to enter secret information that is specific to that user. Thereafter the management system authorizes access to the resource only on condition that all the users U1, . . . , Un have each entered their respective secret information into the management system G2 and after the management system G2 has checked that the secret information entered is indeed the secret information specific to the respective users.

The users U1, . . . , Un obtain the secret information specific to them when they register with the management system G2 beforehand during a registration step, for example. Users can choose their own secret information or secret information can be assigned to them by a manager of the resource R3. If the information is assigned by the resource manager it knows the secret information of the users U1, . . . , Un. The secret information is for example a string of alphanumeric characters. The string is specific to the user and known only to that user, i.e. it is not known to other users. The secret information that is specific to a user constitutes one portion of segmented secret information that protects the resource R3. The complete (or "global") secret information that protects the resource R3 is referred to below as the secret information SR. The secret information that is specific to a given user Ui (I=1, . . . , n) (i.e. each user's portion of the secret information SR, both expressions being used below) is designated "SUi". The waiting step 29 in this implementation includes not only verifying that all the users U1, . . . , Un have requested access to the resource R but also checking that the secret information SU1, . . . , SUn specific to each of the users U1, . . . , Un has been entered. In this implementation, the management system G2 protects access to the resource R3 by means of the secret information SR.

For example, if the resource R3 is a will, the secret information SR is produced by the notary in the capacity of resource manager (under present law the notary has access to the will at all times and thus knows all parts of the secret information SR). The secret information SR is for example functionally equivalent to the combination of a safe in which the notary stores the will.

For access to a telephone bridge, it is the service platform hosting the telephone bridges that produces the secret information SR.

For the method of the invention to work, the management system G2 must know:

a first asymmetric encryption function C;

a second asymmetric encryption function f;

the position p of secret information SUi that is specific to a user U1 in the segmented secret information of the resource SR, the position of such secret information being denoted (SUi: p);

the result of encryption of all the secret information SUi by the function C, denoted C(SUi); and the result of crossed encryption of the secret information of the resource SR by the functions f and C, denoted SR_encrypted.

The management system G2 obtains the above information in the following manner:

The first asymmetric encryption function C.

This could be chosen by the manager of the resource R3, for example, or stored in the management system G2 when it is initialized.

The second asymmetric encryption function f.

This could also be chosen by the manager of the resource R3, for example, or stored in the management system G2 when it is initialized.

The position p of secret information SUi that is specific to a user U1 in the segmented secret information of the resource SR (SUi: p).

The manager of the resource SR segments the secret information of the resource and chooses the position p in that segmentation of the secret information SUi of a user U1. To simplify the explanation, it is assumed that the manager chooses in the segmented secret information SR the position 1 for the secret information SU1, the position 2 for the secret information SU2, and so on, up to the position n for the secret information SUn. The resource manager indicates to the management system the position chosen for the secret information of each user. For example, the manager of the resource R3 communicates to the management system G2 a table associating the user secret information with the position of the secret information of the user in the segmented secret information SR. This table is stored in the management system G2 and associated with the property authorization of access to the resource R3. For example, a database of the management system could contain the following table: {authorization of access to the resource R3, (SU1: 1), ..., (SUn: n)}. In this table, (SU1: 1) indicates that the secret information of the user U1 occupies position 1 in the segmented secret information SR and (SUn: n) indicates that the secret information of the user Un occupies position n in the secret information SR. The management system G2 thus knows the position occupied by the secret information SU1, ..., SUn of each user.

The result C(SUi) of encryption of all the secret information SUi by the function C.

Users give the management system G2 their secret information during the registration step and the management system G2 encrypts the secret information on the fly, so that the management system knows only the result of encryption of the secret information stored in a non-volatile memory, for example in a database. C(SUi) denotes the result of encrypting the secret information of the user Ui. Under such circumstances, for example, the management system includes a database with the following table: {C, (C(SU1): 1), ..., (C(SUn): n)}.

The result SR_encrypted of crossed encryption of the secret information of the resource SR by the functions f and C.

This encryption is achieved in the following manner. Once all users know their own secret information, the management system G2 encrypts on the fly using the function f the result of the concatenation of all the secret information SUi of the users U1, ..., Un encrypted by the function C. The concatenation is effected by placing the encrypted secret information C(SUi) in its associated position, i.e. the position chosen by the resource manager for the secret information of the user Ui. The management system G2 could store the pair {f, SR_encrypted} in a database. The result SR_encrypted is calculated on the fly (i.e. the management system G2 knows only the encrypted result SR_encrypted as being: SR_encrypted=f(C(SU1), C(SU2), ..., C(SUn)), where C(SU1), C(SU2), ..., C(SUn) here represent the concatenation of all encrypted secret information SUi of the users U1, ..., Un, by placing the encrypted secret information C(SUi) at the position associated with the secret information of the user U1.

In contrast, the position p of the secret information SUi that is specific to the user Ui in the segmented secret information of the resource SR is not known to the management system.

Because the management system stores f and SR_encrypted, any user who gives all parts SUi of the secret information SR to the management system can access the resource R3. If all the parts SUi_given are given to the management system G2, the management system G2 can calculate the value of the result of the operation f(C(SU1_given), C(SU2_given), ..., C(SUn_given) and compare it with its stored value of SR_encrypted. If the two values are equal, thus if f (C(SU1_given), C(SU2_given), ..., C(SUn_given) =SR_encrypted, the management system can allow access to the resource R3 by any user giving all the parts SUi_given of the secret information SR. Because the users U1, ..., Un have only one portion SUi of the secret information SR, a user cannot access the resource R3 on their own, and it is necessary for all the users to give their portion SUi of the secret information SR for the management system G2 to be able to recalculate SR_encrypted_given=f(C(SU1_given), C(SU2_given), ..., C(SUn_given) (because the management system G2 knows the position p of each part SUi of the segmented secret information SR), and to compare it with its stored value SR_encrypted to authorize users to access the resource R3 or not.

In this implementation, the step 29 uses a temporary variable V. Under such circumstances, the temporary variable V changes as a function of the secret information given: V=f(C(SU1_given), C(SU2_given), ..., C(SUn_given)). If the secret information has not yet been given its value is set to 0. For example, the management system verifies whether V=SR_encrypted each time a user requests access to the resource or after a predetermined time period has elapsed. If equality is achieved, all users have access to the resource R3 from the same time.

There follows an example that illustrates the theory set out above:

The resource manager logically segments the secret information SR into four parts. The parts can be of equal or unequal size: for example, the secret information of the user U1 can comprise a string of eight characters whereas the secret information of the user U3 can comprise a string of 80 characters. If the secret information SR is #12345ABDCE00000FFFFF in hexadecimal representation, one possible segmentation is SU1=#12345, SU2=#ABDCE, SU3=#00000 and SU4=#FFFFF. The manager of the resource R3 knows all the parts SU1, . . . , SU4 but the users U1, . . . , U4 each know only their own respective part SU1, . . . , SU4 (i.e. their own secret information).

It is also possible for each user U1, . . . , U4 to be able to choose their own secret information SU1, . . . , SU4 and for the resource manager not to know that secret information.

It is important for the management system to know the position of the secret information in the segmented secret information of the resource.

Consider again the above example of the secret information SR where the second user U2 receives the part SU2=#ABDCE: when this user U2 requests access to the resource R3, it communicates this part to the management system G2. As is clear to the person skilled in the art, to recalculate SR_encrypted_given the management system must know that the user U2 gave it the second part. If not, the management system would have a priori to test 4!=24 combinations, which would compromise its operating speed.

As is clear to the person skilled in the art, the secret information SUi of the users U1, . . . , Un can also be used during the authentication steps 21, 25, 211. When a user gives the secret information SUi_given, the management system verifies that C(SUi_given)=C(SUi) for that user. If so, the user is authenticated and the waiting step 29 can be initiated. If not, the management system prompts the user to give their secret information again until they are authenticated.

One implementation is conditional on the order of the user access requests. This means that, after a request from a given user to access the resource R1, the management system waits for another given user to request access to the resource R1. The order could be for example U1, U2, U3, up to Un. The condition can also be linked to the time that elapses between two successive requests; for example, after a given first user requests access to the resource R1, the next user must request access within one hour. If the next user does not request access within one hour, the request of the first user is withdrawn. Other conditions or combinations of conditions can easily be envisaged by the person skilled in the art. The invention also provides for a user to be able to withdraw their access request, for example if they are not authorized to access the resource after a predetermined time period.

One implementation of the invention can equally be generalized, instead of to a plurality of users, to the problem of strong authentication, where a single user has more than one item of secret information and it is necessary for them to enter all their secret information to access a resource.

It is equally possible to link access to the resource to the condition that some of the users U1, . . . , Un must have requested access to it. For example, if n=10, it would suffice for seven users to have requested access to the resource for all ten users to be able to access it.

Two concrete examples of applications of the method of the invention are described below.

Example 1

An important telephone conference call is to take place only if all those invited to participate are present.

The telephone conference call is a resource accessible by all the invited participants (all users). The telephone conference call resource is protected by the identity management system as described in relation to the working of the invention. This solution guarantees that the conference bridge opens only if all those invited to participate have requested to be connected to it. It furthermore provides proof that all those invited to participate did in fact participate in the meeting.

Example 2

A notary wishes to be able to store wills in electronic form and to make wills available for reading via the Internet.

From a legal point of view:
when the testator is alive, only the testator and the notary have the right to access the will;
after the death of the testator, the will must be read by the notary in the presence of all beneficiaries. The notary could operate an Intranet protected by a management system. The will is stored on the Intranet and only the notary and the testator have the right to access it. This uses conventional techniques.

On the day that the testator dies, the notary sends an instruction to the management system, which then prompts all beneficiaries to create an account in the management system of the notary's Intranet (if they do not already have one). The secret information protecting the will is then constructed as indicated in relation to the invention. The invention guarantees that the will can be read by all beneficiaries via the Internet provided that all beneficiaries have consented to this. The solution further provides proof that the will has been read in the presence of all beneficiaries.

Instead of concatenation, it is also possible to calculate the secret information of the resource SR from some other functional relationship between the secret information SUi of the users Ui and the secret information SR of the resource.

It is further possible to assign two (or more) items of secret information SUi to the same user. To access a resource, this user must enter all the secret information assigned to them. As is clear to the person skilled in the art, this strengthens the protection of the resource.

The invention claimed is:
1. A computer-implemented method of managing access to a resource through a communication network by a group of users comprising a first user and at least one second user, the method comprising:
assigning beforehand, to each user of the group, a secret information specific to the user, and assigning beforehand, to the resource, a secret information specific to the resource, said resource specific secret information being determined as a function of the user specific secret information of all the users;
receiving from the first user a first request for accessing the resource, said first request including a secret information given by the first user, and verifying that the secret information given by the first user corresponds to the secret information specific to the first user;
verifying, using a processor of the computer, that all the users of the group have requested access to said resource through the communication network and have given the secret information specific to each user;
determining a value of the resource specific secret information from all the user specific secret information given, and comparing said value with the assigned resource specific secret information; and authorizing all the users to access the resource if said determined value of the resource specific secret information equals the assigned resource specific secret information.

2. The method according to claim 1, wherein a request by a given user of the group for accessing the resource, is associated with a step of authentication of that given user, whereby the access to the resource is authorized to all of said first and said at least one second users once all of the users have requested access to said resource and have been authenticated.

3. The method according to claim 2 further comprising, after receiving from the first user said first access request, a step of reporting completion of said first access request to said at least one second user.

4. The method according to claim 1, wherein said user specific secret information is chosen by a resource manager.

5. The method according to claim 1, wherein said user specific secret information is chosen by said users.

6. The method according to claim 1, wherein the step of determining said value of the resource specific secret information includes changing a variable as a function of said user specific secret information given.

7. A computer program stored on a non-transitory computer-readable medium, comprising program code instructions for carrying out the method according to claim 1 when said program is executed on a computer.

8. The method according to claim 1, further comprising:
prompting all the users of the group to enter secret information specific to each user of the group, after the first request from the first user has been received; and
inhibiting access to said resource as long as not all of the users of the group have correctly entered the secret information.

9. The method according to claim 1, further comprising assigning a secret information specific to each user of the group by segmenting a string of characters into string segments, and assigning a string segment and an associated position to each user of the group, said string of characters being the secret information specific to the resource.

10. A management system for managing access to a resource through a communication network by a group of users comprising a first user and at least one second user, the system comprising:
means for assigning beforehand, for each user of the group, a secret information specific to the user, and for the resource a secret information specific to the resource, said resource specific secret information being determined as a function of the user specific secret information of all the users;
means for receiving from any user of the group a request to access a resource;
means for verifying that all the users of the group have requested access to said resource through the communication network and have given the secret information specific to each user;
means for determining a value of the resource specific secret information from all the user specific secret information given, and for comparing said value with the assigned resource specific secret information; and
means for authorizing all the users to access the resource if said determined value of the resource specific secret information equals the assigned resource specific secret information.

\* \* \* \* \*